United States Patent
Järnebrink et al.

(10) Patent No.: US 6,630,228 B1
(45) Date of Patent: Oct. 7, 2003

(54) DISPLAY COVER

(75) Inventors: Per Järnebrink, Täby (SE); Mats Järnebrink, Rimbo (SE)

(73) Assignee: MIB Marketing AB, Rimbo (SE)

( * ) Notice: Subject to any disclaimer, the term of this patent is extended or adjusted under 35 U.S.C. 154(b) by 0 days.

(21) Appl. No.: 09/743,955

(22) PCT Filed: Jul. 15, 1999

(86) PCT No.: PCT/SE99/01273
§ 371 (c)(1),
(2), (4) Date: Jan. 18, 2001

(87) PCT Pub. No.: WO00/08825
PCT Pub. Date: Feb. 17, 2000

(30) Foreign Application Priority Data

Jul. 23, 1998 (SE) ............................................. 9802599

(51) Int. Cl.⁷ ............................................. B32B 23/02
(52) U.S. Cl. ..................... 428/195; 428/131; 428/192; 428/194; 428/909; 428/913.3; 156/99; 156/278; 427/256; 427/284
(58) Field of Search ................. 428/131, 192, 428/194, 195, 909, 913.3; 156/99, 278; 427/284, 256

(56) References Cited

U.S. PATENT DOCUMENTS 5,214,794 A * 5/1993 Van Wijnen ................ 455/351
5,613,223 A * 3/1997 Ross et al. .................. 361/814

FOREIGN PATENT DOCUMENTS

EP        0 841 680 A1 *   5/1998

* cited by examiner

Primary Examiner—William P. Watkins, III
(74) Attorney, Agent, or Firm—Young & Thompson

(57) ABSTRACT

A display cover for mobile phones, for example. The display cover is intended to be applied over a display of a device. The display is subjected to external damage from scratches and impacts, during use of the device. The display cover includes an optically clear protective film. The protective film has on one side a protective frame of a shock absorbing material. The protective frame defines a display window on the protective film. The protective film has surface portions on the side that faces away from the protective frame. The surface portions are equipped with an adhesive or prepared for receiving an adhesive.

15 Claims, 5 Drawing Sheets

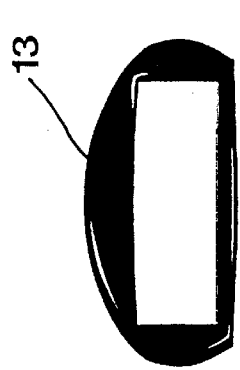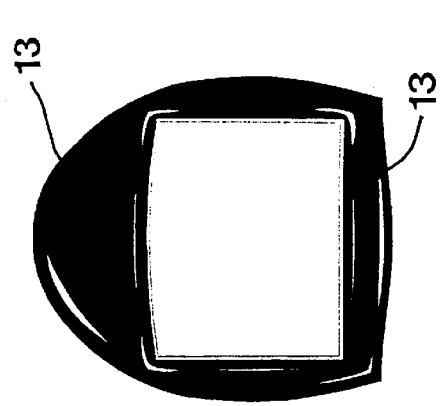
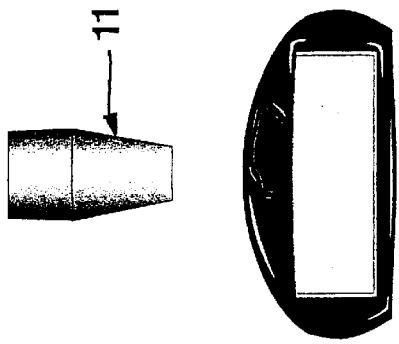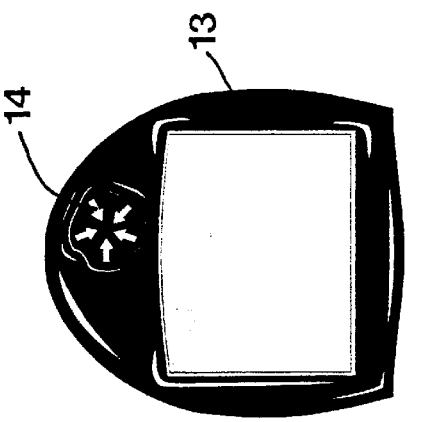
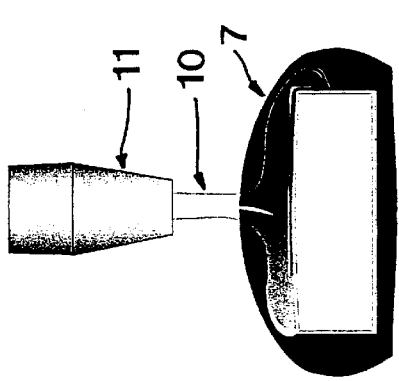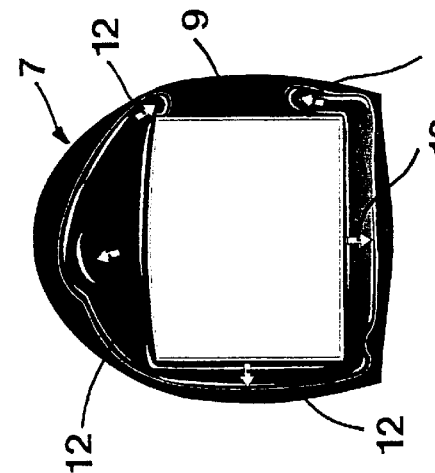
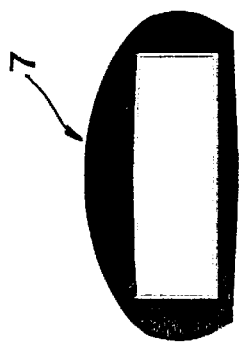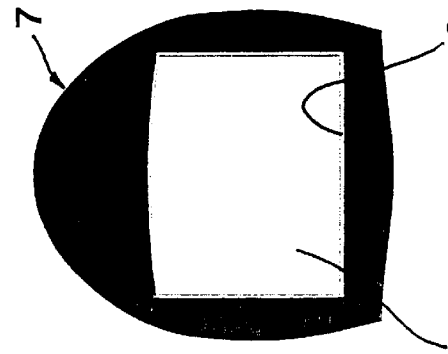

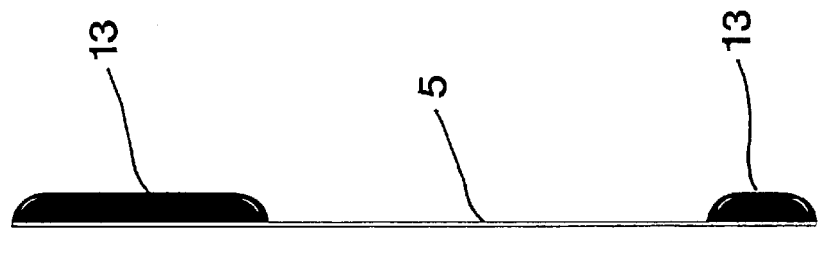
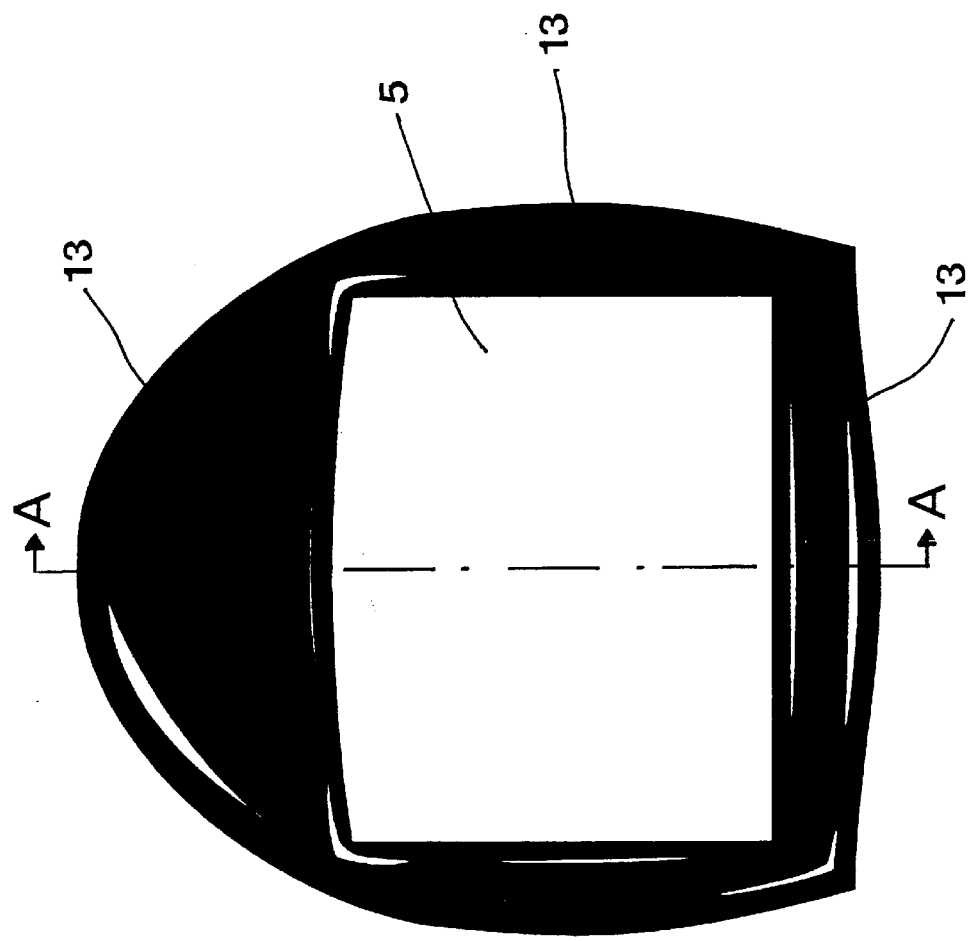

DISPLAY COVER

TECHNICAL FIELD OF THE INVENTION

The present invention relates to a display cover, e.g. for mobile phones, said display cover being intended to be applied over a display of a device. The invention also relates to a method for manufacturing a display cover according to the present invention.

PRIOR ART

When mobile phones are delivered it is common that they are provided with a protective film attached to the display of the mobile phone. The purpose of said protective film is not for permanent use but it is intended to constitute a protection for transport, said protection being removed when the use of the mobile phone is initiated. This means that the display of the mobile phone is unprotected when the mobile phone is put into use. Although it is not necessary to remove said protective film in connection with the initiated use of the mobile phone, the material of the protective film or its adhesion against the display is not of such a quality that it is suitable for permanent use. Normally, said protective film is not completely transparent and damage of the protective film will occur after some time of normal use of the mobile phone, e.g. in the shape of scratches and other wear. This will to a further degree make it more difficult to read the information disclosed in the display. It is also likely that the protective film will loosen, the loosening beginning in the corner areas of the protective film, which eventually results in that the entire protective film loosens from the display.

In this connection it should also be pointed out that normally the material itself in the display is not especially durable against scratches or other wear, and thus after some time of use there might arise problems to read the information disclosed in the display.

OBJECTS AND FEATURES OF THE INVENTION

A primary object of the present invention is on one hand to provide an effective protection against scratches and other wear of a display and on the other hand to provide a protection against shocks and impacts for said display and adjacent areas of the equipment having said display.

A further object of the display cover according to the present invention is that at least a part of the display cover should be self-restoring to a certain extent.

BRIEF DESCRIPTION OF THE DRAWINGS

An embodiment of a display cover according to the present invention has been described below, reference being made to the accompanying drawings, where:

FIG. 4a shows a perspective view of the blank according to FIG. 3;

FIG. 4b shows a top view of the blank according to FIG. 3;

FIG. 5a shows a perspective view of the blank according to FIG. 3 when a shot of material is applied to said blank, said material in hardened state being shock absorbing;

FIG. 5b shows a top view of the blank according to FIG. 3 when a shot of a material is applied to said blank, said material in hardened state being shock absorbing;

FIG. 6a shows a perspective view illustrating how the material, that in hardened state is shock absorbing, has been spread out on the frame of the display cover, said frame being equipped with adhesion coating;

FIG. 6b shows a top view illustrating how the material, that in hardened state is shock absorbing, has been spread out on the frame of the display cover, said frame being equipped with adhesion coating;

FIG. 7a shows a perspective view of a blank for a display cover according to the present invention, said blank being ready for hardening;

FIG. 7b shows a top view of a blank for a display cover according to the present invention, said blank being ready for hardening;

FIG. 8 shows a top view, in a larger scale, of a finished display cover according to the present invention, i.e. the material that in hardened state is shock absorbing forms a frame around the display window;

FIG. 9 shows a section along A—A in FIG. 8; and

DETAILED DESCRIPTION OF A PREFERRED EMBODIMENT

OF THE DISPLAY COVER ACCORDING TO THE PRESENT INVENTION

Figure 1:
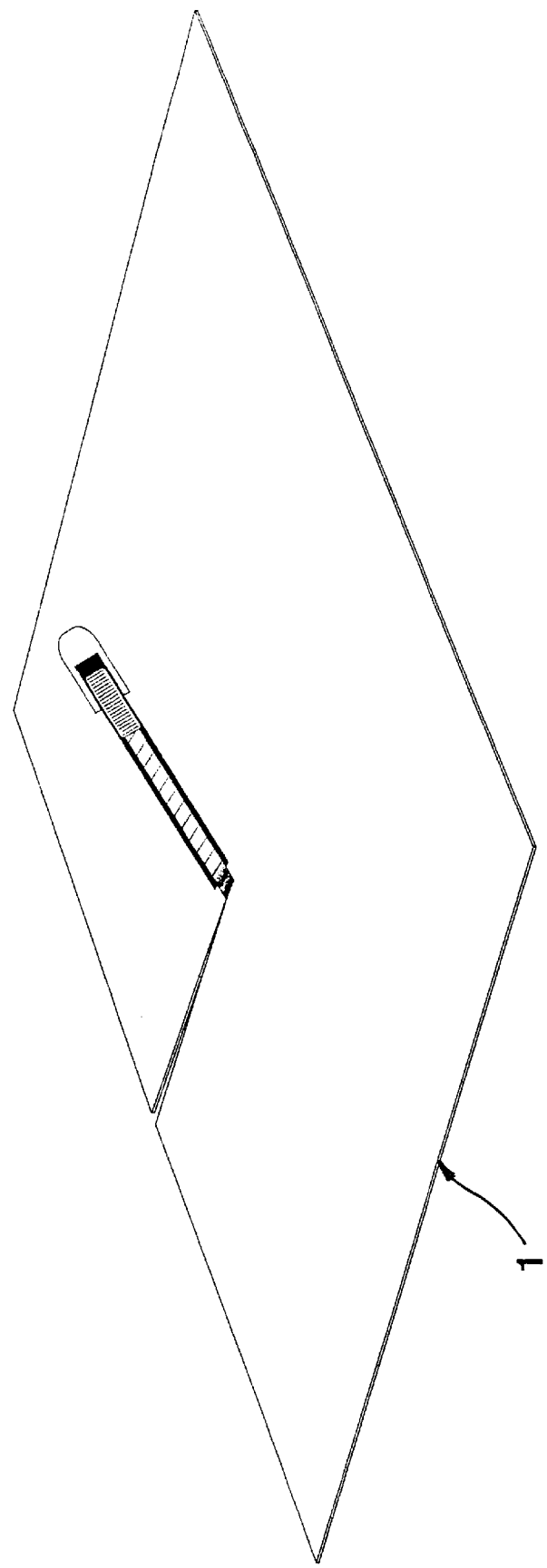
FIG. 1 shows a perspective view of the cutting of a sheet of a primary material of the protective film of the display cover.

As is evident from FIG. 1 the manufacturing of the display cover according to the present invention starts with the cutting of a sheet of a protective film 1 of a PVC material having an additional plasticizer that makes the material both durable against scratches and shock absorbing. The protective film 1 is relatively thick, suitable thickness being in the interval 0.2–0.5 mm. A basic requirement for the present PVC material is a very high optical clearness and a very high resistance against scratches and impacts. It is also preferable if said PVC material is suitable for screen printing since the protective film 1 usually will be equipped with a printing, e.g. a company logotype or other information, see below. A suitable commercially available PVC material for the protective film 1 has turned out to be Clearshield©.

Figure 2:
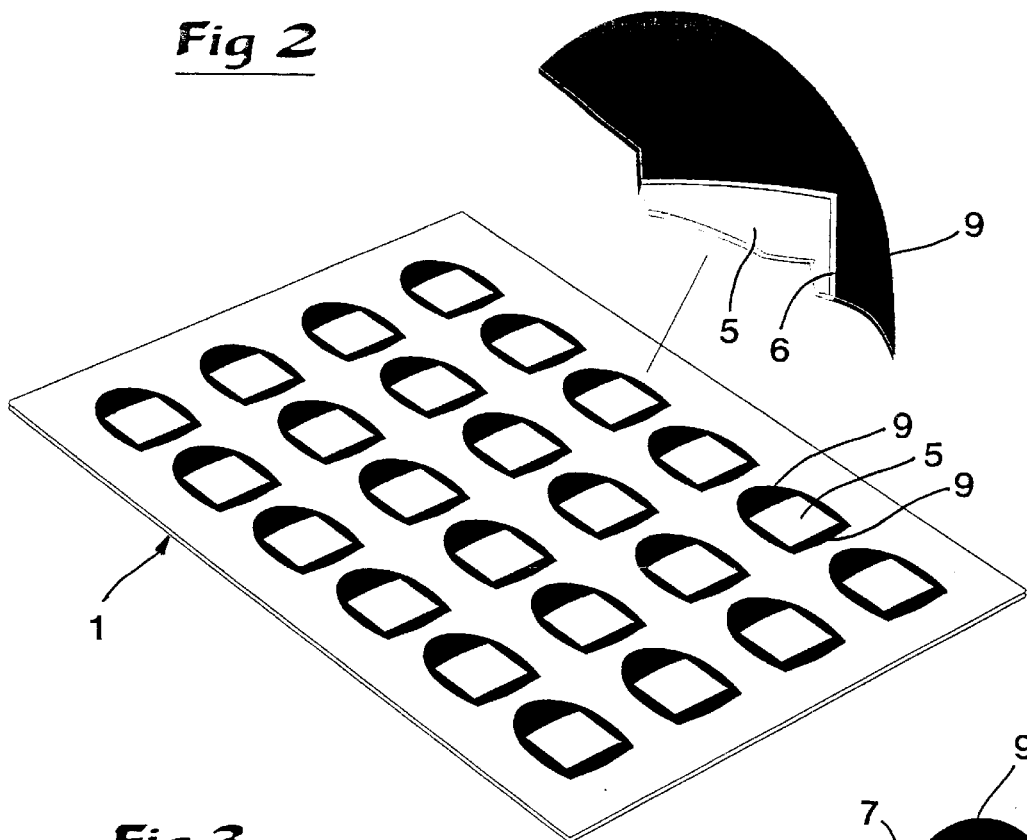
FIG. 2 shows a perspective view of the cut out sheet where adhesion coating has been applied on certain areas, a portion of said areas being disclosed in a larger scale.

The cut out sheet is acclimatized for printing (pre-shrinked) in order to eliminate inherent stresses in the primary material. As is illustrated in FIG. 2 an adhesion coating 3 is applied or screened to the portions of the protective film 1 that will constitute a frame 9 of the display cover according to the present invention. A non-adhesion coating in the shape of a narrow delimiting frame 6 is applied or screened to the portions that will constitute the display windows 5 of the display cover according to the present invention, see the enlarged detail in FIG. 2. Said delimiting frame 6 extends around the entire display window 5 and the width is suitably about 1 mm. By applying the adhesion coating it is guaranteed that the portion of the PVC material, i.e. the frame 9, to which the adhesion coating has been applied has a good bond strength relative to the polyurethane that will be applied in a later state, see below. If there is a need to provide the display cover according to the present invention with a screen printing, e.g. in the shape of a company logotype, such screen printing is effected on a suitable portion of the protective film 1, see the finished display cover in FIG. 10. Said screen printing will be located on the portion of the protective film 1 that has been treated with adhesion coating.

Figure 3:
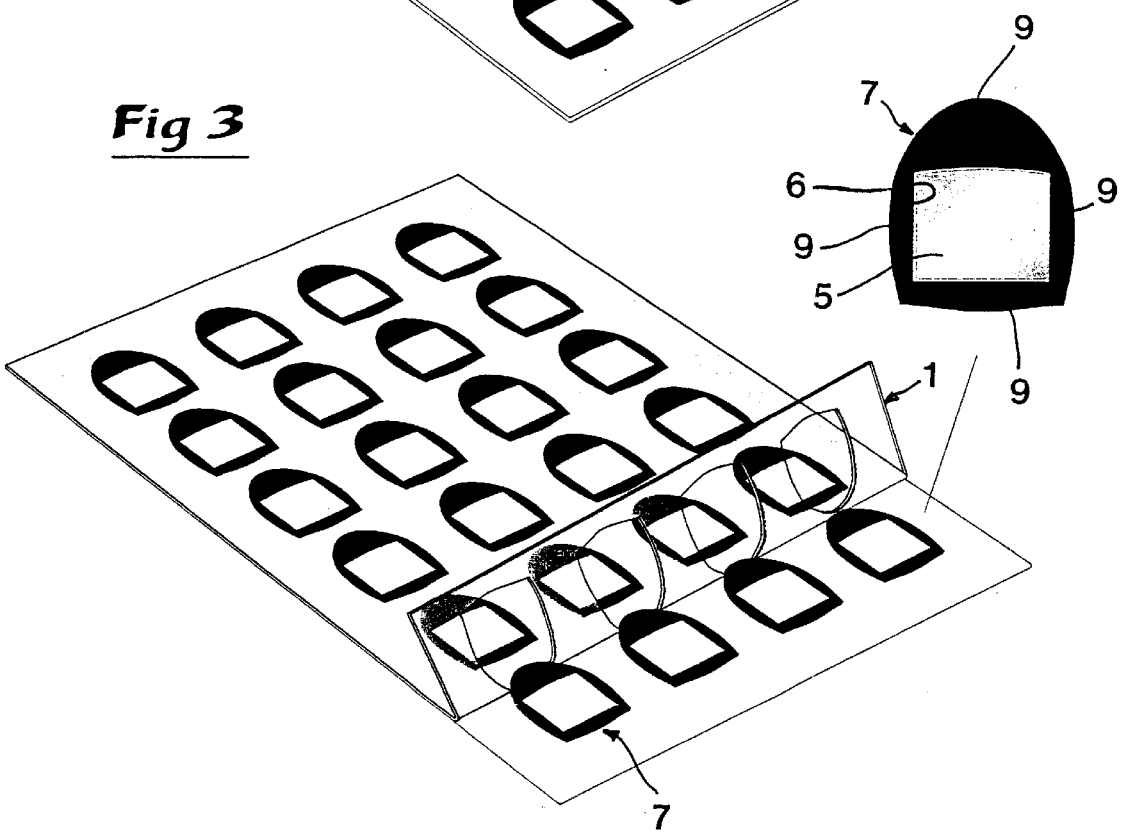
FIG. 3 shows a perspective view where cutting out of blanks for the display cover is effected, such a blank being disclosed in a larger scale.

As is illustrated in FIG. 3 the sheet of protective film 1 is stamped out to suitable shape, i.e. excessive material is removed. Thereby, blanks 7 for the display cover according to the present invention are achieved, said blanks 7 having a display window 5 with a delimiting frame 6 of non-adhesion coating and a surrounding frame 9 that has been treated with adhesion coating. In FIGS. 4a and 4b such a blank 7 is disclosed.

In FIGS. 5a and 5b is illustrated how polyurethane (resin) 10, via a nozzle 11, is applied to the blank 7 in liquid state. Two components are mixed and fed via said nozzle 11. The amount of polyurethane 10 that is applied in liquid state is controlled by the surface that is to be coated and the coatings applied to the blank 7. As is illustrated by the arrows 12 in FIGS. 5a and 5b the polyurethane 10, applied in liquid state, will spread on the frame 9 that has been treated with adhesion coating. The delimiting frame 6 of non-adhesion coating will prevent the polyurethane 10 from spreading on the display window 5.

When the applying of the polyurethane 10 has ceased, see FIGS. 6a and 6b, the in liquid state applied polyurethane 10, due to its surface tension, will assume the shape of an elevated protective frame 13. The polyurethane 10 will gather on and adhere to the portion of the blank 7 that is treated with adhesion coating and located around the display window 5 itself, i.e. the frame 9. The arrows 14 in FIG. 6b illustrate how the polyurethane 10 contracts and evens out the area of supply of the polyurethane 10. The, in liquid state applied, polyurethane 10 has thus created an elevated protective frame 13 on the blank 7 around the display window 5, see FIGS. 7a and 7b.

Then the blank 7, with the applied polyurethane 10, said polyurethane 10 being in the shape of a protective frame 13, is allowed to harden during a suitable time at a suitable temperature. Normally the protective frame 13, consisting of polyurethane lo, is deep hardened in a heating chamber for a period of 24 to 48 hours. Thereby, the polyurethane 10 has a molecular bond to the protective film 1.

In FIGS. 8 and 9 a finished display cover according to the present invention is shown in a larger scale. Especially from FIG. 9 it is learnt how the protective frame 13 is applied to the protective film 1 and forms an elevation around the display window 5. Despite the fact that the delimiting frame 6 has not been removed from the display window 5, said delimiting frame 6 has not been drawn in FIGS. 8 and 9 since said the frame normally is transparent and has no longer any function after the hardening of the polyurethane 10.

The elevated protective frame 13 of polyurethane, formed in the described way, has the property of being shock absorbing and partly self-restoring against surface damage. Due to the fact that both the protective film and the frame are shock absorbing the display cover according to the present invention has an extremely good shock absorbing ability in the area where the protective film and the frame overlap each other. The protective frame 13 preferably has a thickness in the interval 1.5–3 mm.

Figure 10:
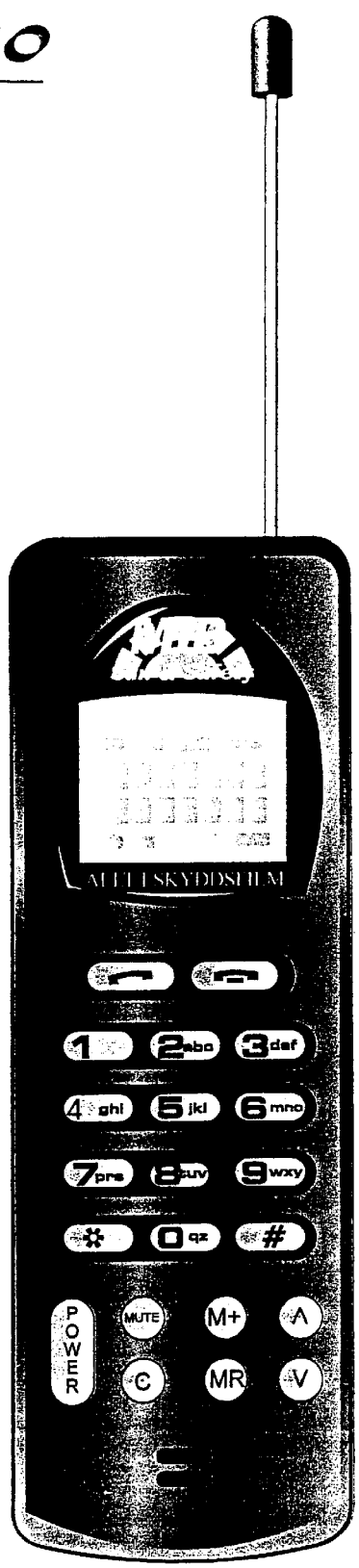
FIG. 10 shows a top view of a mobile phone, a display cover according to the present invention being mounted on said mobile phone.

The display cover, manufactured in the described way, is now ready to be mounted, e.g. on a mobile phone, see FIG. 10. In connection with the stamping from the protective film 1 the blank 7 is given such dimensions that it will suit to the object that the display cover is mounted upon. In the exemplified case of a mobile phone the adaption is made to a specific model of a certain trademark. The actual mounting is preferably carried out by adhesion and a laminating adhesive has turned out to be suitable, said laminating adhesive being marketed by 3M from the 200 MP-series and used in connection with adhesion that requires high optical clearness. The laminating adhesive is applied as a sticky layer on the side of the display cover that will adhere to the mobile phone or other device having a display. Preferably the laminating adhesive is applied over the entire pending side of the display cover. As a transporting protection a foil or paper sheet may be applied to the sticky layer, said foil/paper sheet being removed in connection with the mounting of the display cover. For the sake of clarity it should be pointed out that before the display cover according to the present invention is applied, the temporary protective film that has been described under the headline Prior Art is removed.

In this connection it should be mentioned that if the display, that the display cover is mounted upon, has scratches or the like the laminating adhesive also has a healing effect upon said display. This means that the laminating adhesive fills out said scratches and the surface that is visible through the display window 5 becomes clear again.

The display cover according to the present invention has normally also an effect on the light refraction, the result of this being that the signs that are visible through the display window 5 are somewhat enlarged. This leads to that it becomes easier to read said signs.

As is apparent from FIG. 10 the display cover disclosed in said figure is equipped with for instance a company logotype at the top of said display cover. Preferably, said company logotype is screen printed on the protective film 1 before the polyurethane is applied, see FIGS. 5a and 5b. In such a case the polyurethane is transparent, which means that the company logotype is visible through the protective frame 13 of polyurethane.

FEASIBLE MODIFICATIONS OF THE INVENTION

In this connection it should be emphasised that the method described above to manufacture a display cover according to the present invention only constitutes a preferred example. Within the scope of the present invention it is thus possible to manufacture a frame of polyurethane as a separate unit, and then connect said frame and the protective film by means of a suitable adhesive.

The elevated frame of polyurethane, said frame being part of the display cover, may either be manufactured in a coloured or uncoloured material. Further said frame may also be manufactured in a different material than polyurethane, said different material being suitable for the appliance in question.

In the embodiment described above it is stated that text/objects may be screen printed on the protective film. Within the scope of the invention it is also feasible to use other printing techniques than screen printing, e.g. offset printing and/or embossing.

Instead of using the above stated laminating adhesive, other adhesives may of course be used in order to mount the display cover on for instance a mobile phone. Within the scope of the invention it is also feasible that the user himself apply an adhesive/a glue in connection with the mounting of the display cover.

The embodiment described above of the display cover according to the present invention refers to a display cover for a mobile phone. However, within the scope of the present invention other areas of appliance for the display cover are feasible and in exemplifying and non-restricting purpose watches and instruments equipped with a display may be mentioned.

What is claimed is:

1. Display cover for mobile phones, said display cover being intended to be glued on a display of a mobile phone, said display cover comprising:

an optically clear protective film extending over a display;

an adhesive applied on one side of said protective film, said adhesive covering an entirety of said one side; and a protective frame of shock absorbing material on another side of the protective film, said protective frame defining a display window on the protective film and being elevated relative to the protective film.

2. Display cover according to claim 1, characterized in that the protective frame (13) has a molecular bond to the protective film (1).

3. Display cover according to claim 1, characterized in that the protective frame (13) is manufactured from polyurethane.

4. Display cover according to claim 3, characterized in that the polyurethane is of two component type.

5. Display cover according to claim 1, wherein a primary material of the protective film is suitable for printing.

6. Display cover according to claim 1, characterized in that the protective film (1) is manufactured from shock absorbing PVC material.

7. Method for manufacturing a display cover for mobile phones, said display cover being intended to be glued on a display of a mobile phone, said display cover including an optically clear protective film, said method comprising the steps of:

applying an adhesive on one side of said protective film, said adhesive covering an entirety of said one side;

applying on another side of the optically clear, protective film an adhesive coating and a non-adhesive coating in different areas of said film;

applying a material, in liquid state, to the area having an adhesive coating, said material in a hardened state being shock absorbing and forming an elevated protective frame on said area; and deep hardening said material during suitable conditions.

8. Method according to claim 7, wherein said applying an adhesive coating step includes applying the adhesive coating so that a frame forms around the area to which the non-adhesive coating has been applied;

said method further including the steps of stamping a blank from the protective film, wherein the material constitutes a two component polyurethane, said material in the hardened state being shock absorbing, said two component polyurethane being applied to the frame of the blank, and the polyurethane spreads over said frame, and the surface tension of the polyurethane prevents the polyurethane from spreading into the area having the non-adhesive coating.

9. Method according to claim 7, wherein the step of applying a material in a liquid state includes feeding the material via a nozzle, said material being shock absorbing in a hardened state.

10. Method according to claim 7, characterized in that the deep hardening of the material takes place in a heating chamber during a period of 24 to 48 hours, said material in hardened state being shock absorbing.

11. The display cover according to claim 5, wherein the primary material is suitable for screen printing.

12. A display cover comprising:

an optically clear protective film extending over a display;

an adhesive on an entirety of a first side of said prective film; and means for defining and pretecting a display window on a second side of said pretective film.

13. The display cover according to claim 12, wherein said means for defining and protecting a display window is a protective frame of shock absorbing material surrounding said display window.

14. The display cover according to claim 13, wherein the protective frame is polyurethane molecularly bonded to said protective film.

15. The display cover according to claim 13, wherein the protective frame increases a thickness of the display cover in areas other than the display window.

* * * * *